June 19, 1951    A. J. BARRY    2,557,778
BONDING RUBBER TO GLASS
Filed April 21, 1949
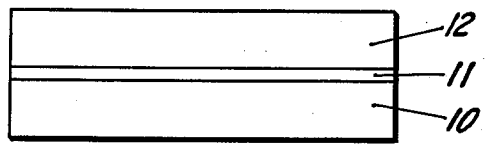
INVENTOR.
ARTHUR J. BARRY
BY
ATTORNEY Patented June 19, 1951

2,557,778

UNITED STATES PATENT OFFICE 2,557,778

BONDING RUBBER TO GLASS

Arthur J. Barry, Midland, Mich., assignor to Dow Corning Corporation, Midland, Mich., a corporation of Michigan Application April 21, 1949, Serial No. 88,913

5 Claims. (Cl. 154—128)

This invention relates to organic elastomers bonded to inorganic solids and to methods for effecting such bonding. It also relates to composite articles comprising vulcanized rubber and glass permanently bonded to each other and to a method for making such articles.

It is an object of the present invention to provide a method for securing to siliceous surfaces organic materials such as rubber which have heretofore been difficult to attach thereto. It is a further object to provide glass with a coating which adheres tenaciously to the surface thereof, and to which rubber bonds strongly and permanently.

In accordance herewith, a surface of a siliceous solid is coated with a hydro-polychlorosilyl addition product of a rubber hydrocarbon. A polymeric rubber hydrocarbon is then vulcanized in contact with the coated surface. The product comprises vulcanized elastomer and siliceous solid permanently bonded to each other.

For a fuller understanding of the nature and objects of the invention, reference may be had to the following description, taken in conjunction with the accompanying drawing in which 10 is a siliceous solid, 11 is a hydro-polychlorosilyl addition product of a rubber hydrocarbon, and 12 is a vulcanized polymeric rubber hydrocarbon. For clarity of illustration, the thickness of the bonding layer, 11, has been exaggerated.

Siliceous solids of concern herein include materials such as glass fibers, sheet glass, glass fabrics, ceramics and porcelain.

Hydro-polychlorosilyl addition products of rubber hydrocarbons herein employed are compositions of natural rubber or elastomeric butadiene-styrene copolymers which addition products contain radicals of the general formula

$$-\mathrm{Si(CH_3)}_n\mathrm{Cl}_{3-n}$$

where $n$ is 0 or 1, bonded to carbon atoms of the hydrocarbon by a carbon to silicon linkage. Preferred compositions have a silicon content of from 10 to 50 percent, based on the carbon content thereof.

These addition products may be conveniently prepared by the process disclosed in my copending application Serial Number 45,204, now Patent No. 2,475,122, July 5, 1949, filed jointly with De Pree and Hook. In accordance therewith, a polyolefinic rubber hydrocarbon is reacted with trichlorosilane or methyldichlorosilane. A mixture of the hydrocarbon and silane in the proportions of from 0.25 to 1.0 mol of the latter per olefinic bond in the former is maintained at a temperature of from room temperature to 400° C. under sufficient pressure that at least a portion of the reaction mixture is in liquid phase. If desired, the reaction may be carried out in the presence of a liquid aromatic or saturated aliphatic hydrocarbon, which serves to distend the rubber, and thereby increases the accessibility to the double bonds of the rubber. The liquid hydrocarbon is employed in the proportion of from 1 to 20 parts thereof per 10 parts of the combined weights of the other ingredients. Under these conditions reaction takes place with the introduction of chlorosilyl radicals into the hydrocarbon polymer at olefinic linkages. Apparently the reaction is one of addition, whereby at least some of the double bonds become saturated. When the reactants are employed in the proportions stated, the addition products are suitable for purposes hereof.

In the practice of the invention, the hydro-polychlorosilyl addition product of the rubber hydrocarbon is applied as a coating to a surface of the solid which is to be bonded to rubber. The material may be applied alone or admixed with a volatile solvent, such as benzene. Solutions which contain from 2 to 50 percent by weight of the hydro-polychlorosilyl rubber are particularly satisfactory. Such solutions are readily spread over the glass surface by conventional methods, as by spraying or dipping. The solvent is then volatilized, and the coating is allowed to dry, as in air. The thickness of the coating is not critical. One coat may be employed. However, a plurality of coats may be used if a thicker coating is desired.

Polymeric rubber hydrocarbons which are vulcanized in contact with the above-described coatings are polyolefinic hydrocarbons, particularly natural rubber and elastomeric butadiene-styrene copolymers. In practice, the elastomer may be compounded with conventional fillers and vulcanizing agents. Conventional methods of effecting vulcanization, such as heat and pressure, are satisfactory for purposes hereof.

Example 1

A 2.4 liter autoclave was charged with 194.5 grams smoked sheet Hevea braziliensis, 162 grams trichlorosilane (0.5 mol silane per double bond), and 562 grams of benzene. The autoclave was closed and heated for 16 hours at a temperature of from 299° to 303° C. The maximum pressure developed was 1000 pounds per square inch. The autoclave was cooled and the product discharged. The product was concentrated by heating at 200°

C. at 2 mm. absolute pressure. The residual brown, viscous liquid was a hydro-trichlorosilyl addition product of the rubber. Compositions prepared in this way contain from 15 to 20 percent silicon based on carbon content of the product.

A 2 percent solution of the addition product in benzene was applied to woven glass fiber fabric by dipping. The fabric was then heated for 3 hours at 100° C. Another piece of the fabric was treated with the same solution and allowed to stand at room temperature for 3 hours. Natural rubber was vulcanized in contact with each piece of fabric. In both instances, the glass and vulcanized rubber were not separable by mechanical means. When rubber was vulcanized in contact with a piece of untreated glass fabric, the glass and rubber could be readily separated from each other.

*Example 2*

The autoclave described in Example 1 was charged with 194 grams smoked sheet *Hevea braziliensis*, 326 grams trichlorosilane (1 mol silane per double bond), and 374 grams of benzene. The autoclave was heated at 300° C. for 16 hours. The reaction product, free of solvent, was a brown, viscous liquid. It contained approximately 28 percent silicon based on its carbon content.

A 50 percent solution of the product in benzene was applied as a coating to sheet glass, after which the solvent was evaporated by heating for 15 minutes at 100° C. A second application of the solution was then made, and the treated glass was allowed to stand for 6 hours at room temperature. Natural rubber compounded with carbon black and sulfur was vulcanized in contact with the coated glass surface. The vulcanized rubber adhered strongly to the glass. When the compounded rubber was vulcanized in contact with untreated sheet glass little or no adherence of the rubber to the glass was observed.

*Example 3*

A mixture of 276 grams of methyldichlorosilane, 194.5 grams *Hevea braziliensis* in the form of smoked sheet (1 mol silane per double bond), and 374 grams of benzene was heated in a 2.4 liter autoclave at a temperature of from 295° to 300° C. for 16 hours during which time the maximum pressure was 915 pounds per square inch. The resultant methyldichlorosilyl addition product of the rubber contained 20 percent silicon based on the carbon content of the product.

When this addition product of rubber is applied to the surface of glass it forms a strongly adherent coating thereon. When rubber is vulcanized in contact with such coating, the vulcanized product adheres tenaciously to the glass.

*Example 4*

A mixture of 326 grams trichlorosilane, 194 grams of an unvulcanized GR-S type rubber (75 butadiene-25 styrene copolymer) and 374 grams of benzene was heated in a 2.4 liter autoclave for 16 hours at an average temperature of 300° C. The maximum pressure developed was 810 pounds per square inch. The hydrotrichlorosilyl addition product of the GR-S rubber was a brown, very viscous liquid. It contained 24 percent silicon based on the carbon content of the material.

Sheet glass was coated by dipping it into a benzene solution containing 46 percent by weight of the above product. The coating was clear and smooth after standing in air at room temperature for 15 minutes. When GR-S type rubber is vulcanized in contact with such coated surface, it becomes strongly bonded thereto.

That which is claimed is:

1. The method of bonding a polymeric rubber hydrocarbon to a siliceous solid, which comprises applying to a surface of the solid a coating of a hydro-polychlorosilyl addition product of a rubber hydrocarbon of the group consisting of natural rubber and elastomeric butadiene-styrene copolymers, which addition product contains radicals of the formula $-Si(CH_3)_nCl_{3-n}$, where $n$ is an integer from 0 to 1, bonded to carbon atoms of the rubber hydrocarbon, the silicon content of said addition product being from 10 to 50 percent based on the carbon content thereof, and vulcanizing a polymeric rubber hydrocarbon of the group consisting of natural rubber and elastomeric butadiene-styrene copolymers in contact with said coated surface.

2. The method in accordance with claim 1 in which the siliceous solid is glass.

3. The method in accordance with claim 1, in which $n$ equals 0.

4. The method in accordance with claim 1 in which $n$ equals 1.

5. A composite structure comprising a siliceous base member and a vulcanized polymeric rubber hydrocarbon secured thereto by an intermediate bonding means, said bonding means being comprised of a hydro-polychlorosilyl addition product of a rubber hydrocarbon selected from the group consisting of natural rubber and elastomeric butadiene-styrene copolymers, which addition product contains radicals of the formula $$-Si(CH_3)_nCl_{3-n}$$

where $n$ is an integer from 0 to 1, bonded to carbon atoms of the rubber hydrocarbon, the silicon content of said addition product being from 10 to 50 per cent based on the carbon content thereof.

ARTHUR J. BARRY.

REFERENCES CITED

The following references are of record in the file of this patent:

UNITED STATES PATENTS

| Number | Name | Date |
|---|---|---|
| 2,389,641 | Sarbach | Nov. 27, 1945 |
| 2,436,304 | Johannson | Feb. 17, 1948 |
| 2,475,122 | Barry et al. | July 5, 1949 |